(12) United States Patent
Patterson et al.

(10) Patent No.: US 7,504,969 B2
(45) Date of Patent: Mar. 17, 2009

(54) LOCALITY-BASED STREAM SEGMENTATION FOR DATA DEDUPLICATION

(75) Inventors: R. Hugo Patterson, Mountain View, CA (US); Umesh Maheshwari, San Jose, CA (US)

(73) Assignee: Data Domain, Inc., Santa Clara, CA (US)

( * ) Notice: Subject to any disclaimer, the term of this patent is extended or adjusted under 35 U.S.C. 154(b) by 268 days.

(21) Appl. No.: 11/484,881

(22) Filed: Jul. 11, 2006

(65) Prior Publication Data

US 2008/0013830 A1 Jan. 17, 2008

(51) Int. Cl.
*H03M 7/34* (2006.01)
(52) U.S. Cl. .......................... 341/51; 341/50
(58) Field of Classification Search ............ 341/50, 341/51; 704/235; 345/649
See application file for complete search history.

(56) References Cited

U.S. PATENT DOCUMENTS

| | | | | |
|---|---|---|---|---|
| 4,914,605 | A * | 4/1990 | Loughmiller et al. | 345/649 |
| 5,990,810 | A | 11/1999 | Williams | |
| 6,667,700 | B1 * | 12/2003 | McCanne et al. | 341/51 |
| 2004/0024598 | A1 * | 2/2004 | Srivastava et al. | 704/235 |
| 2005/0035332 | A1 | 2/2005 | Nagashima et al. | |
| 2005/0162288 | A1 * | 7/2005 | McCanne et al. | 341/51 |

OTHER PUBLICATIONS

Udi Mamber. "Finding Similar Files in a Large File System." In proceedings of the USENIX Winter 1994 Technical Conference, pp. 1-10, San Francisco, CA, 17-21, 1994.
Schleimer et al. "Winnowing: Local Algorithms for Document Fingerprinting." SIGMOD 2003, Jun. 9-12, 2003, San Diego, CA. pp. 76-85.
Kulkarni et al. "Redundancy Elimination Within Large Collections of Files." 2004 USENIX Annual Technical Conference, Boston, MA, Jun. 2004.
Andrei Z. Broder. "Some applications of Rabin's fingerprinting method." In R. Capocelli, A. De Santis and U. Vaccaro, editors, Sequences II: Methods in Communications, Security, and Computer Science, Springer Verlag, 1993.

* cited by examiner

*Primary Examiner*—Jean B Jeanglaude
(74) *Attorney, Agent, or Firm*—Van Pelt, Yi & James LLP (57) ABSTRACT

Selecting a segment boundary comprises determining a segmentation window is determined and computing a plurality of values associated with candidate boundaries within the segmentation window. Selecting a segment boundary further comprises selecting one of the candidate boundaries based at least in part on a comparison between two or more of the computed values and determining a boundary within the segmentation window.

30 Claims, 9 Drawing Sheets

LOCALITY-BASED STREAM SEGMENTATION FOR DATA DEDUPLICATION

BACKGROUND OF THE INVENTION

Information stored on computer systems often contains substantial redundancies. Storage, communication, and comparison of information can be made more efficient if the information can be segmented intelligently. For example, if a segment has been previously stored or transmitted, then a subsequent request to store or transmit the segment can be replaced with the storage or transmission of an indicator identifying the previously stored or transmitted segment. The indicator can then be used to reconstruct the original segment by referring to the previously stored or transmitted version.

Selecting the boundary of the segment intelligently improves efficiency. For example, if a sequence of bytes appears identically in a number of different locations in the data set or stream (e.g., 'XYZABCDERNNABCDE' contains two occurrences of 'ABCDE') and that sequence of bytes ('ABCDE') is defined to be one of the segments, then the system could avoid storing the second occurrence of the segment and instead store a reference to the first copy. Note if a segment boundary is defined differently each time, then the system may or may not be able to recognize the identical run of bytes in two different segments—for example, a segment of 'ABCDEX' and a segment of 'XABCDE' may or may not be recognized in the system as having the same sequence of information of 'ABCDE.' If a segment boundary divides 'XXXABCDEXXXX' into 'XXXABC' and 'DEXXXX' then 'ABCDE' would not be found as a previously stored sequence. It is important to partition the segments so that the runs of identical bytes are grouped together in the same segment in order to achieve a better storage or transmission efficiency.

Also, it is important to be able to establish minimum and maximum limits for segments. Simply locating anchors and setting boundaries can produce segments that are not limited to lengths within minimum and maximum limits for segments and thus require a separate evaluation and decision processes in order to satisfy the minimum and maximum segment length constraints.

It would be beneficial to select boundaries that are likely to increase the amount of similar or identical data value areas in segments to help with the efficiency of storage, communication, or comparison. It would also be beneficial to not have separate evaluation and decision processes in order to satisfy minimum and maximum segment length constraints.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Selecting a segment boundary is disclosed. A segmentation window is determined. A plurality of values are computed that are associated with candidate boundaries within the segmentation window. One of the candidate boundaries is selected based at least in part on a comparison between two or more of the computed values. A boundary within the segmentation window is determined. In some embodiments, a segmentation window can be determined by determining a first location corresponding to a minimum segment length and determining a second location corresponding to a maximum length where the segmentation window is the segment from the first location to the second location. Determining a boundary can include determining a plurality of windows within the segmentation window. Each window corresponds to a location within the segmentation window and is associated with a candidate boundary.

In some embodiments, a function is then evaluated for each window. The function has as its inputs one or more data values of the window. In various embodiments, the function comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an xor, or any other appropriate function to distinguish a window. After the function values are generated for all windows, a boundary is selected based at least in part on the values that were generated—for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, a criteria of selecting the location that maximizes or minimizes the segment length could be adopted.

In some embodiments, a stack mechanism is used to efficiently track extreme values (e.g., minima) in a segmentation window. The stack mechanism enables storing an ordered list of values and positions since the lowest value found—for example, the bottom of the stack holds the lowest value and its corresponding position, the next position up the stack has the next lowest value and its corresponding position since the lowest value, etc. The stack mechanism prevents recomputation of function values after a boundary has been located and a next boundary location search is started from the recently located boundary. For example, a first boundary search is performed where the function values are computed from within a segmentation window; a boundary is located within that segmentation window; a new segmentation window is defined; for those locations that were both in the previous segmentation window and the new segmentation window, the function values have already been computed and efficiently stored in the stack. Values not shared between the windows (e.g., those excluded by the minimum segment length associated with the new segmentation window) can be removed from the stack (e.g., by pulling them off the bottom of the stack).

Figure 1:
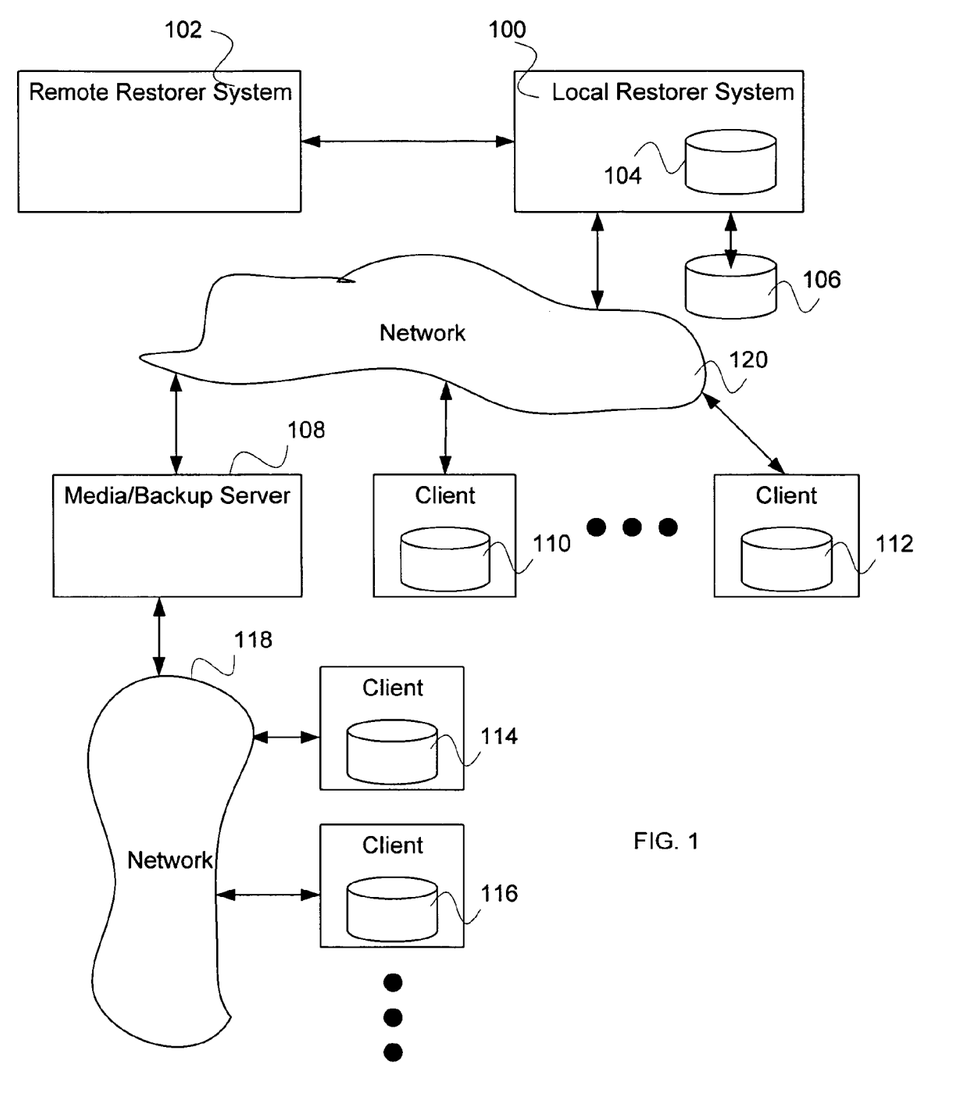
FIG. 1 is a block diagram illustrating an embodiment of a system for efficient storage using resemblance of data segments.

FIG. 1 is a block diagram illustrating an embodiment of a system for efficient storage using resemblance of data segments. In the example shown, local restorer system 100 stores information without loss of information in an input data stream b or input data block b that enables restoration of data originally stored on a client system in the event that the data on the client system is no longer available. Information is stored on an internal storage device 104 or an external storage device 106 of local restorer system 100. In various embodiments, internal storage device 104 comprises one storage device or a plurality of storage devices and/or external storage device 106 comprises one storage device or a plurality of storage devices. Local restorer 100 is in communication with remote restorer 102. Remote restorer 102 stores a copy of information that is stored on local restorer system 100 also enabling restoration of data stored by a client system. In various embodiments, local restorer 100 is in communication with remote restorer 102 using a dedicated communication link, one or more networks, a local area network, a wide area network, a storage area network, the Internet, a wired network, and/or wireless network. In various embodiments, local restorer 100 is not in communication with remote restorer 102 or local restorer 100 is in communication with a plurality of remote restorers.

Local restorer system 100 also communicates with a plurality of client systems represented in FIG. 1 by client system 110 and 112 using network 120. Local restorer system 100 also communicates with media/backup server 108 using network 120. In various embodiments, network 120 comprises one or more networks, a local area network, a wide area network, a storage area network, the Internet, a wired network, and/or wireless network. Media/backup server 108 communicates with a plurality of client systems with storage represented in FIG. 1 by client system with storage 114 and 116 using network 118. In various embodiments, network 118 comprises one or more networks, a local area network, a wide area network, a storage area network, the Internet, a wired network, and/or wireless network. In some embodiments, media/backup server 108 backs up data on client systems with storage which in turn is backed up to local restorer system 100. In various embodiments, local restorer system 100 backs up only one or more clients represented by clients 110 or 112 or only one or more media/backup servers represented by media/backup server 108. In some embodiments, clients (e.g., clients 110, 112, 114, or 116) store data directly on local restorer system 100 and have no local storage disks.

In some embodiments, a similar block diagram is used to implement a general data storage system. A plurality of clients can communicate with a local and a remote data storage system that can efficiently store data/information by storing the information as a plurality of segments or a plurality of segments and differences from segments. The data storage system can reconstruct the stored data by assembling the segments, portions of segments, and/or differences from stored segments into the proper arrangement and provide it to a client, if requested.

Figure 2:
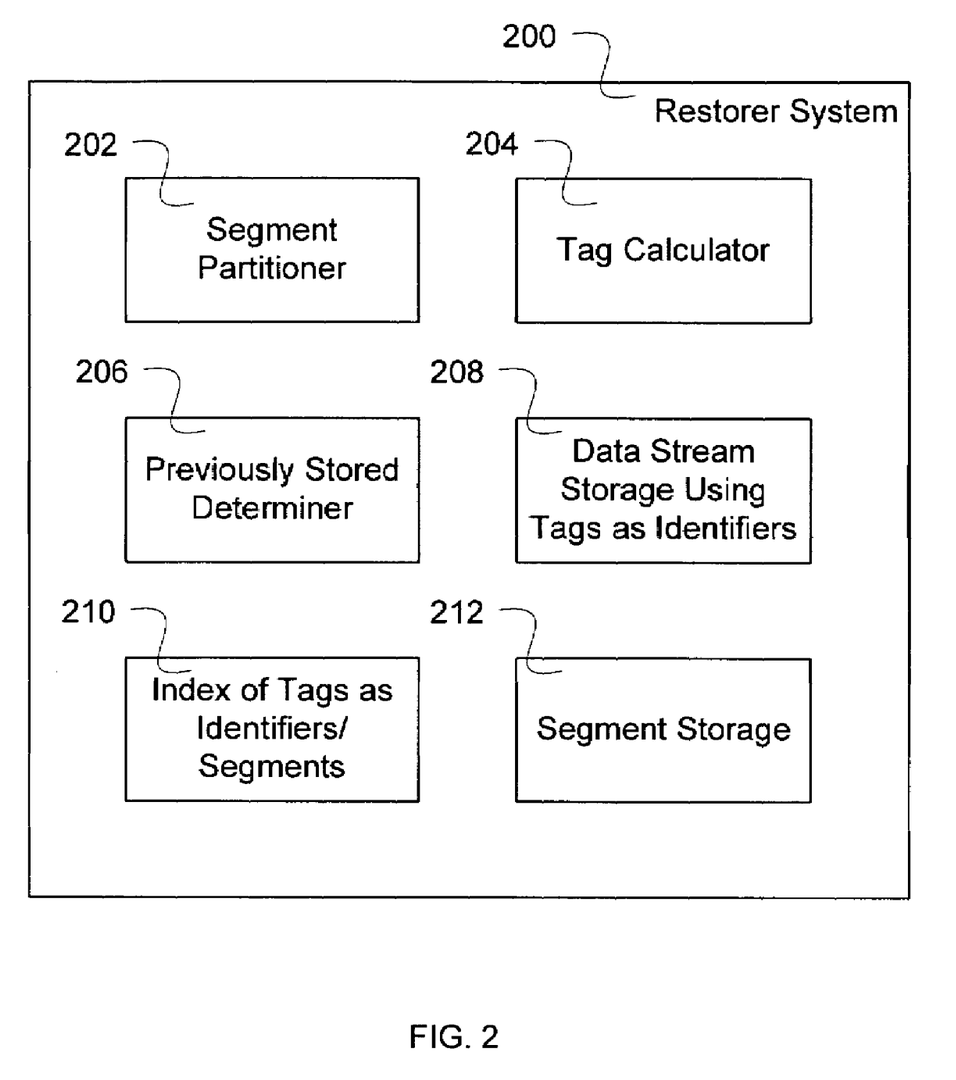
FIG. 2 is a block diagram illustrating an embodiment of a restorer system.

FIG. 2 is a block diagram illustrating an embodiment of a restorer system. In some embodiments, restorer system 200 is used to implement local restorer system 100 and/or remote restorer system 102 of FIG. 1. In the example shown, restorer system 200 includes segment partitioner 202, tag calculator 204, previously stored determiner 206, data stream storage using tags as identifiers 208, index of tags as identifiers/segments 210, and segment storage 212. An input data stream or input data block is partitioned into segments using segment partitioner 202. Segment partitioner 202 partitions segments to enable efficient storage of information in the input data stream. For information that appears multiple times in the input data stream or in the input data block, segment partitioner 202 partitions the input information into segments such that the segments are stored, and if a particular segment, or a very similar segment, appears more than once, the segment can be stored efficiently by referring to the previously stored segment. Segments are partitioned by locating a segmentation window and by determining a boundary within the segment window. In some embodiments, partitioning of segments allows the overlapping of segments.

Tag calculator 204 calculates one or more tags associated with a given segment. A tag can be used to identify a segment uniquely, efficiently determine similarity between segments, locate a segment, or in some cases compare segments. In various embodiments, a tag comprises a function of some or all of the information in the segment, where the function comprises a hash function, SHA-1 (Secure Hash Algorithm 1), MD5 (Message-Digest algorithm 5), SHA-256, SHA-384, SHA-512, RIPEMD-160 (RACE Integrity Primitives Evaluation Message Digest 160-bit version), a sketch, a Rabin hash, a serial number, a physical storage location, or any other appropriate function to distinguish a segment. In various embodiments, a tag is a hash of all of the data values in the segment, some of the data values in the segment, a sampled set of data values in the segment, and/or a masked sampled set of data values in the segment.

Previously stored determiner 206 uses a tag calculated by tag calculator 204 to efficiently determine if the current segment, or a similar segment, has been previously stored. In various embodiments, determining if the current segment, or a similar segment has been previously stored includes searching the tags of previously stored segments to find a match or a close match, matching the current segment with a previously stored segment, finding a similar segment that has been previously stored to the current segment, or any other appropriate method of determining if a segment has been previously stored.

Data stream storage using tags as identifiers 208 stores a representation of an input data stream or block using tags as identifiers in place of the segments that make up the input data stream or block. The representation is compact because the tags as identifiers require less storage space than the actual input data stream.

Index of tags as identifiers/segments 210 associates a segment with a corresponding tag as an identifier. This association between the tags as identifiers and segments enables a data stream or block to be reconstructed by allowing the replacement of a segment data by a corresponding tag as an identifier. A segment, once identified, can be retrieved in full by retrieving the segment from segment storage 212. In some embodiments, there is no index and, for example, the tag is a storage location or the tag is a composite of values such as a sketch and a storage location.

In some embodiments, a similar block diagram is used to implement a transmission system. A transmission system includes segment partitioner, tag calculator, previously transmitted determiner, data stream transmitter using tags as identifiers, index of tags as identifiers/segments, and segment transmitter and storage. In some embodiments, the remote side does the determining—for example, the tag as identifier (e.g., a fingerprint) is sent to the remote side, the remote side determines if the segment is there, indicates if the segment needs to be transmitted, and the segment can then be transmitted/received.

Figure 3:
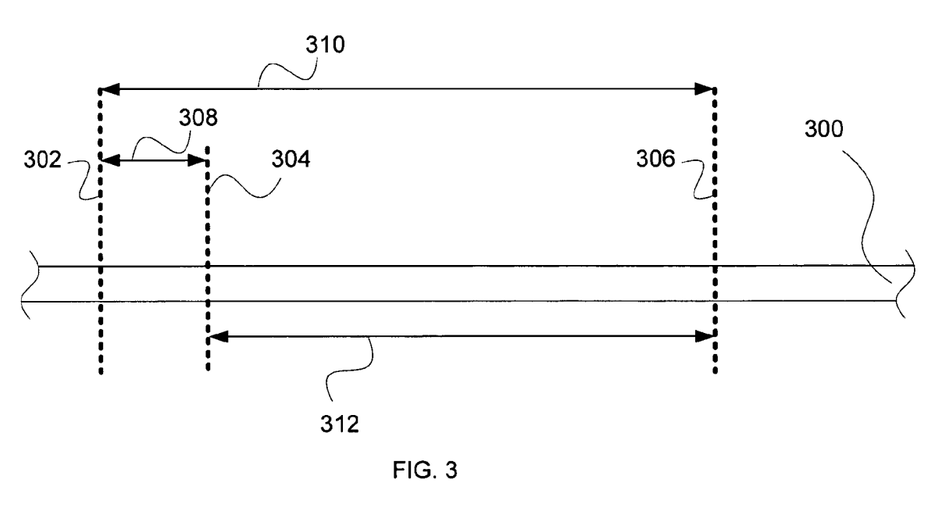
FIG. 3 is a block diagram illustrating a segment window in one embodiment.

FIG. 3 is a block diagram illustrating a segment window in one embodiment. In some embodiments, the segment window of FIG. 3 is used in process 202 of FIG. 2. In the example shown, starting location 302 along data stream or block 300 defines one boundary of a segment. In some cases, starting location 302 is defined by a previous anchor location, a previous segment boundary, the start of the data stream or block, or by any other appropriate location in the data stream or block to define one boundary of a segment. Based on a minimum segment length criteria corresponding to 308, location 304 is determined. Based on a maximum segment length criteria corresponding to 310, location 306 is determined. A segment window is determined based on location 304 and 306. Within the segment window, a plurality of windows, or shingles, are defined corresponding to each data or information value (e.g., byte) location within the segment window. Also, the plurality of windows are associated with a candidate boundary location, which may or may not be the same as the data or information value location with the segment window. In some embodiments, some shingles are not completely within the a given segment window.

Figure 4:
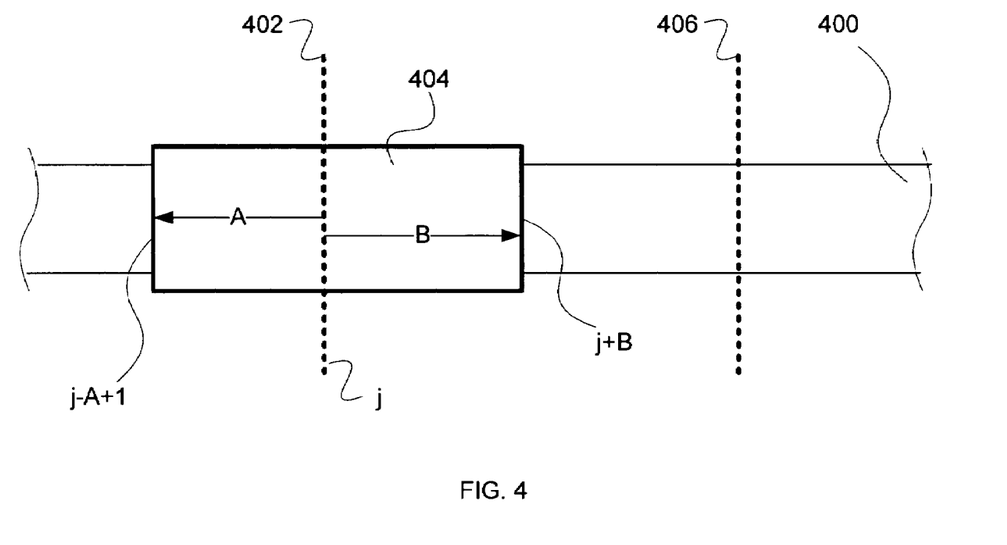
FIG. 4 is a block diagram illustrating an embodiment of a shingle, or window, used for identifying a boundary location.

FIG. 4 is a block diagram illustrating an embodiment of a shingle, or window, used for identifying a boundary location. In some embodiments, the shingle, or window, of FIG. 4 is used in process 202 of FIG. 2. In the example shown, information within data stream or block 400 is indexed with a single index—for example, b[i] where b is data stream or block 400 and i indicates the $i^{th}$ data or information value (e.g., byte) within the data stream or block b. Location 402 is indicated as corresponding to the $j^{th}$ data or information value within data stream or block 400. Shingle 404 extends from j−A+1 to j+B. A plurality of shingles, or windows, exist within the segment window corresponding to each position j within the segment window. Boundary location 406, corresponding to the $j^{th}$ data or information value within data stream or block 400, is determined when the value of a function f corresponding to the $j^{th}$ data or information value meets one or more criteria. In various embodiments, f comprises a hash function, hashing the input data values and AND'ing with a mask, SHA-1 (Secure Hash Algorithm 1), MD5 (Message-Digest algorithm 5), RIPEMD-160 (RACE Integrity Primitives Evaluation Message Digest 160-bit version), a Rabin hash, a CRC (Cyclic Redundancy Check), a sum, an xor or any other appropriate function to distinguish a boundary location. In various embodiments, the criteria satisfied by the value of function f corresponding to the $j^{th}$ data or information value comprises one of the following: being a minimum value compared to the other locations in the segment window, being a maximum value compared to other locations in the segment window, being the $n^{th}$ lowest value or the $m^{th}$ highest value, or any other appropriate value for distinguishing a boundary location. In various embodiments, boundary location 406 is inside (not shown in FIG. 4) or outside of window 404.

Figure 5:
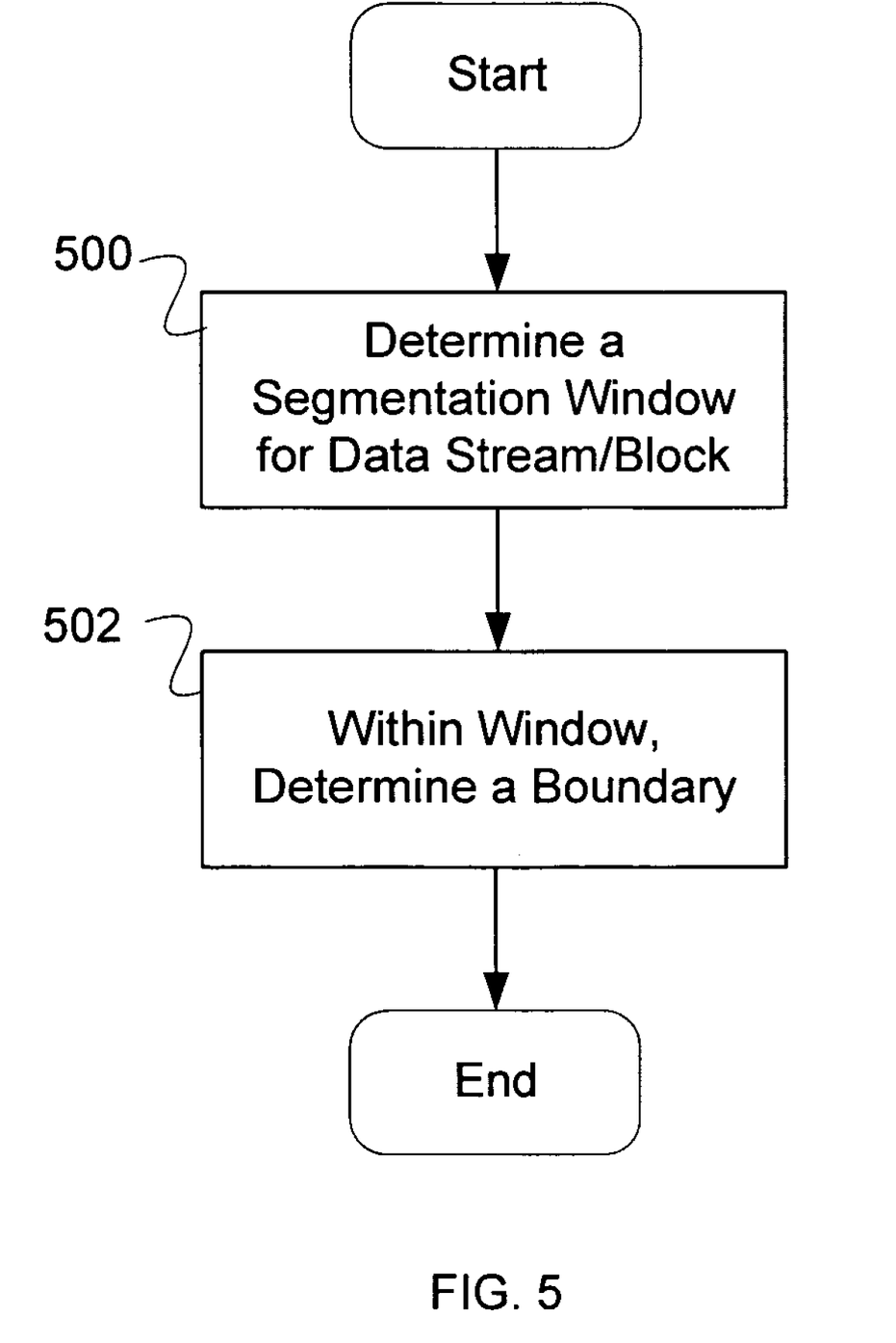
FIG. 5 is a flow diagram illustrating an embodiment of a process for selecting a boundary.

FIG. 5 is a flow diagram illustrating an embodiment of a process for selecting a boundary. In some embodiments, the process of FIG. 5 is implemented in segment partitioner 202 of FIG. 2. In the example shown, in 500 a segmentation window for data stream or data block is determined. The segmentation window defines a region of the data within the data stream or data block where a next segment boundary is desired. In various embodiments, the segmentation window is determined based on a minimum segment criteria, on a maximum segment criteria, on a minimum and a maximum segment criteria, or on any other appropriate segment criteria. In 502, within the segmentation window, a boundary is determined. Within the segmentation window, a function value is calculated for each data location. Based on the function values for each data location, a boundary location is determined. In various embodiments, the boundary location is determined based on an extrema function value for all of the data locations, a minimum function value for all of the data locations, a maximum function value for all of the data locations, a function value with the longest run of 1 bits in its value for all of the data locations, a function value with the most 1 bits in its value for all of the data locations, or any other appropriate selection criteria for the function values.

Figure 6:
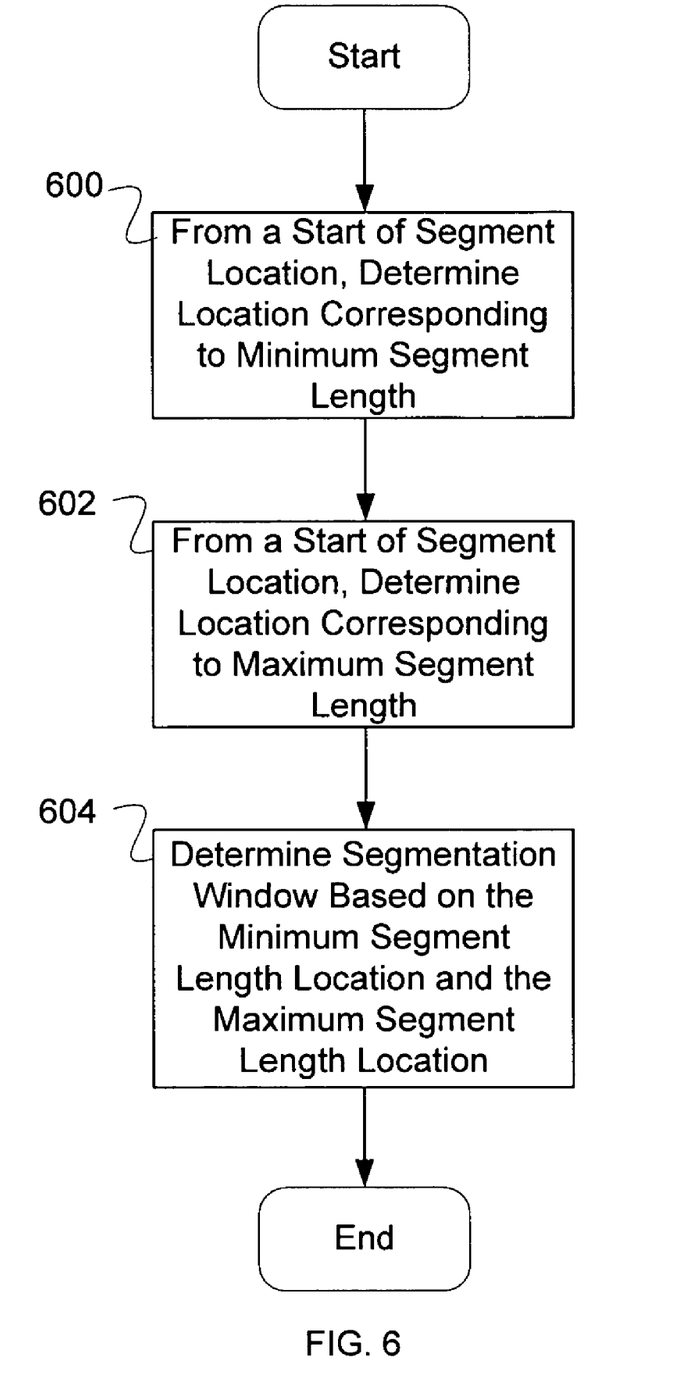
FIG. 6 is a flow diagram illustrating an embodiment of a process for determining a segmentation window.

FIG. 6 is a flow diagram illustrating an embodiment of a process for determining a segmentation window. In some embodiments, the process of FIG. 6 is used to implement 500 of FIG. 5. In the example shown, in 600 from a start of segment location a location corresponding to a minimum segment length is determined. In 602, from a start of segment location a location corresponding to a maximum segment length is determined. In 604, a segmentation window is determined based on the minimum segment length location and the maximum segment length location.

Figure 7:
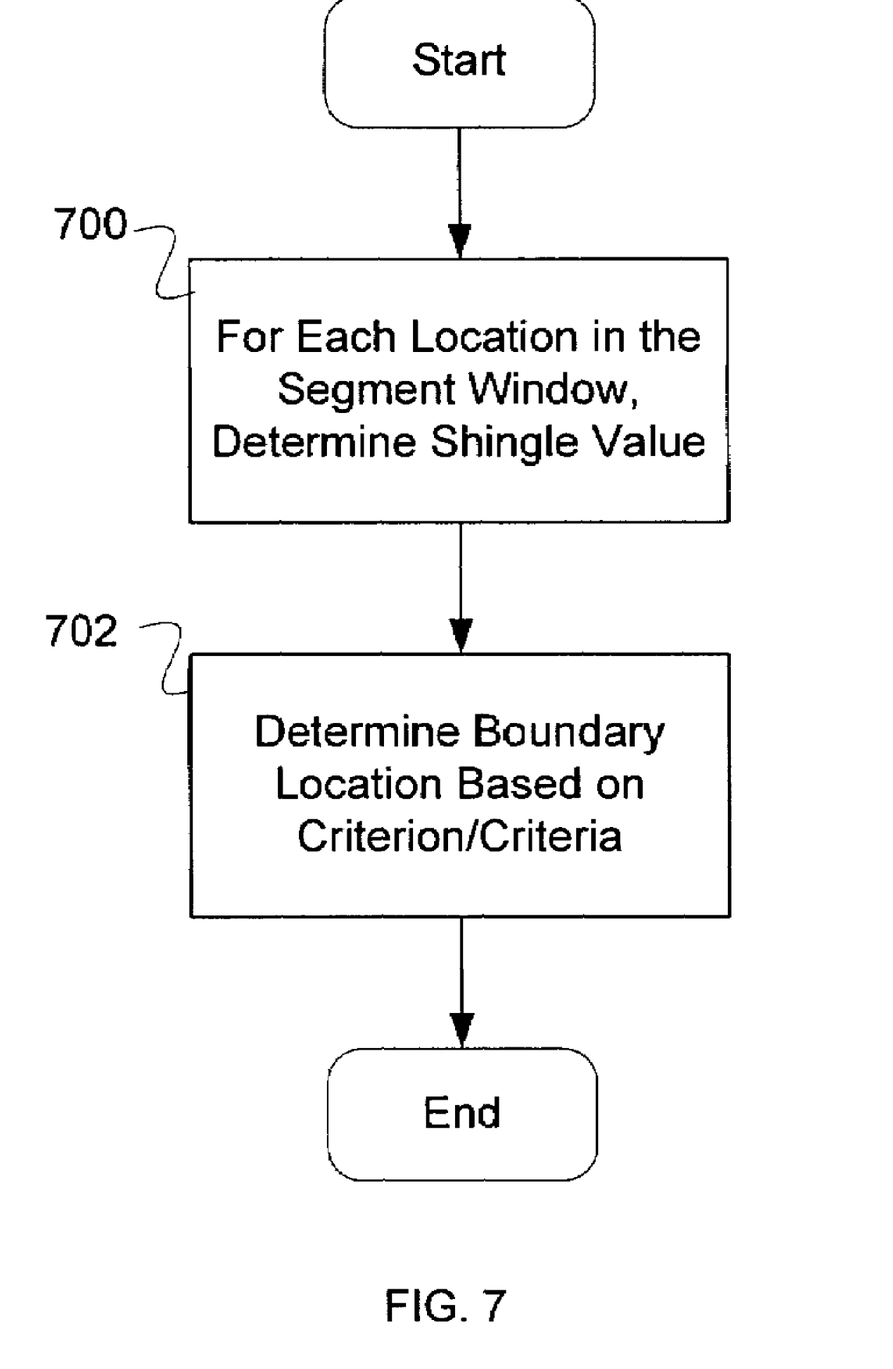
FIG. 7 is a flow diagram illustrating an embodiment of a process for determining a boundary location.

FIG. 7 is a flow diagram illustrating an embodiment of a process for determining a boundary location. In some embodiments, the process of FIG. 7 is used to implement 502 of FIG. 5. In the example shown, in 700 for each location in the segment window determine a function value. In various embodiments, the function value comprises a function of one or more data values within a shingle comprising a hash function, a hash function combined with a masking function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an xor or any other appropriate function to distinguish a shingle. In 702, a boundary location is determined based on one or more criteria. In various embodiments, a criteria for determining a boundary comprises a minimum criteria, a maximum criteria, or any other criteria appropriate for selecting a boundary.

Figure 8:
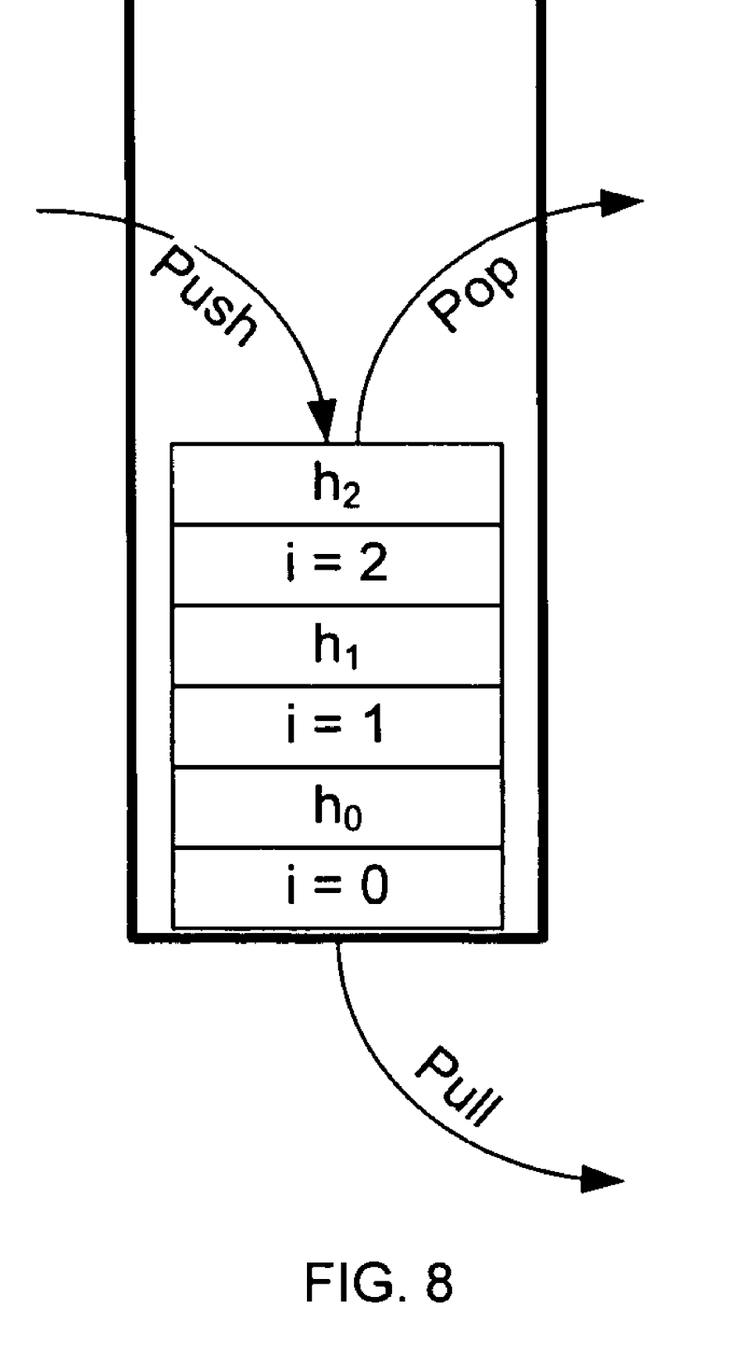
FIG. 8 is a block diagram illustrating a stack for efficiently determining a minimum function value in one embodiment.

FIG. 8 is a block diagram illustrating a stack for efficiently determining a minimum function value in one embodiment. In some embodiments, the stack in FIG. 8 is used to help implement 702 of FIG. 7. In the example shown, a value can be added to the stack by 'pushing' a value on to the top of the stack. The stack in FIG. 8 could have been generated by pushing the following values onto the stack: position value i=0 within the data stream or block, function value $h_0$, position value i=1, function value $h_1$, position value i=2, and function value $h_2$. Values can be removed from the stack by two operations: 'popping' a value off the top of the stack or 'pulling' a value off the bottom of the stack. In some embodiments, the stack enables efficiently storing computed function values to be reused for the next segmentation window.

Figure 9:
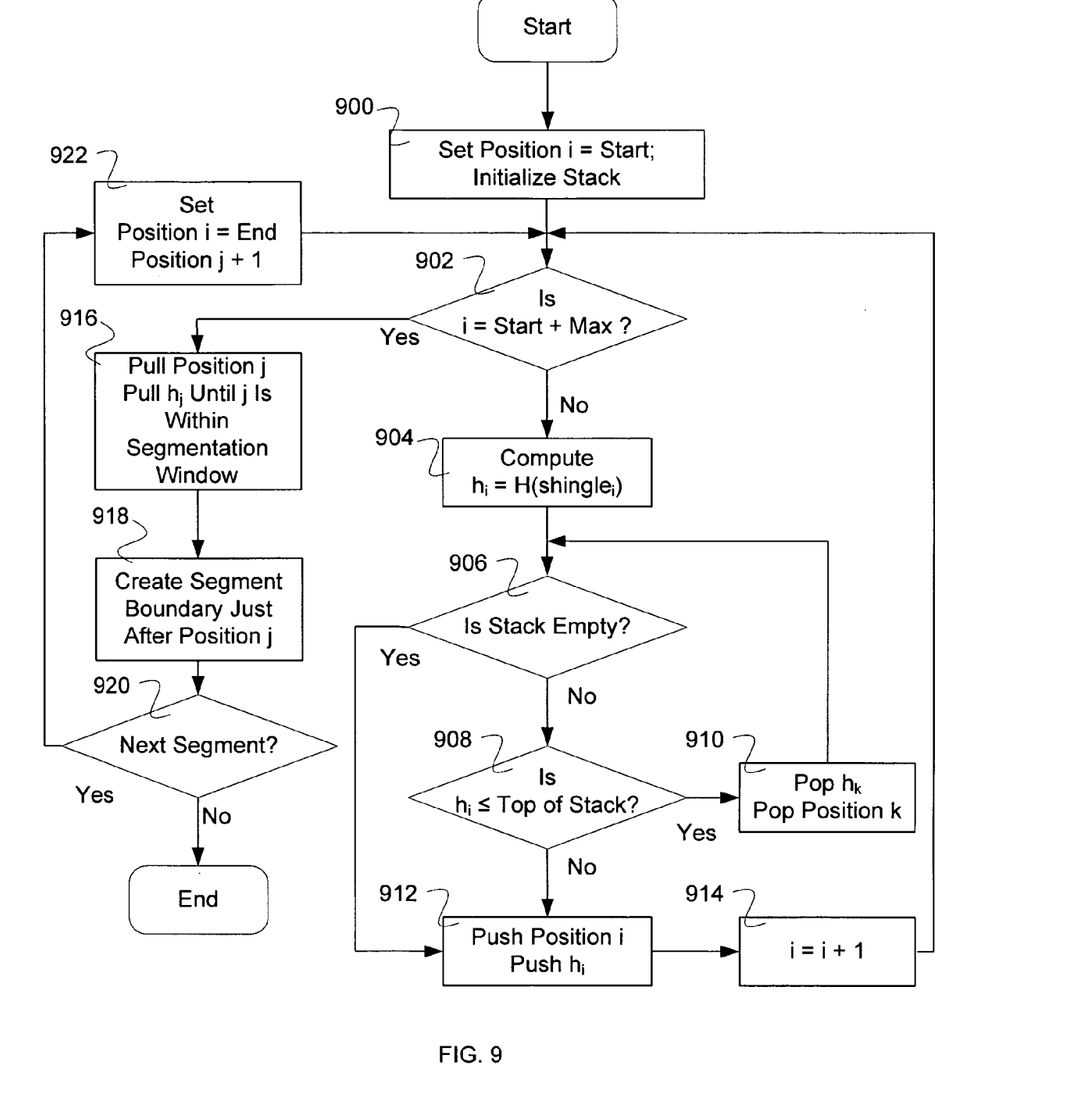
FIG. 9 is a flow diagram illustrating an embodiment of a process for efficiently determining a minimum function value.

FIG. 9 is a flow diagram illustrating an embodiment of a process for efficiently determining a minimum function value. In some embodiments, the process of FIG. 9 is used to help implement 702 of FIG. 7. In some embodiments, a similar process is used to determine a maximum function value. In the example shown, in 900 the position i is set equal to the start position (e.g., the beginning of the segment window), and the stack is initialized. In 902, it is determined if the position i is equal to the start position plus a maximum segment length.

If it is not, then in 904 the value $h_i$ is computed for each position i as a function H operating on the input data found in the $i^{th}$ shingle. In various embodiments, the function H comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an xor or any other appropriate function to distinguish a window. In 906, it is determined if the stack is empty. If it is, then control passes to 912. If it is not, then in 908 it is determined if $h_i$ is less than or equal to the top of the stack. In some embodiments, it is determined if $h_i$ is greater than or equal to the top of the stack and the stack is an ordered list of maximum values since the last maximum value. If it is not, then control passes to 912. If it is, then in 910 the value $h_k$ and corresponding position k are popped off the stack and control passes to 906. In 912, the value $h_i$ and the position i are pushed on the stack, the next position is examined in the segment window (by incrementing i), and control passes to 902.

If in 902, i is equal to the start position plus the maximum segment length, then in 916 position j and $h_j$ are pulled from the bottom of the stack until the position j is within the segmentation window. In 918, a segment boundary is created just after position j. In 920, it is determined if there is a next segment. If there is a next segment, then in 922 position i is set to just after the boundary position, position j+1. In some embodiments, the boundary position, or location, is set offset by an offset distance to position j. If there is not a next segment, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for selecting a segment boundary comprising:
    determining a segmentation window;
    computing a plurality of values associated with candidate boundaries within the segmentation window;
    selecting one of the candidate boundaries based at least in part on a comparison between two or more of the computed values; and
    determining a boundary within the segmentation window.

2. A method as in claim 1, wherein the segmentation window is within a data stream.

3. A method as in claim 1, wherein the segmentation window is within a data block.

4. A method as in claim 1, wherein determining the segmentation window includes determining a location corresponding to a minimum segment length.

5. A method as in claim 1, wherein determining the segmentation window includes determining a location corresponding to a maximum segment length.

6. A method as in claim 1, wherein computing a plurality of values associated with candidate boundaries within the segmentation window includes determining a plurality of windows where each window is associated with a location within the segmentation window.

7. A method as in claim 1, wherein computing a plurality of values associated with candidate boundaries within the segmentation window includes determining a plurality of windows where each window is associated with a candidate boundary within the segmentation window.

8. A method as in claim 1, wherein computing each value includes determining a value of a function based at least in part on one or more data values within one of a plurality of windows.

9. A method as in claim 1, wherein computing each value includes determining a value of a function, wherein the function comprises one or more of the following: a hash function, a hash function combined with a masking function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, or an xor.

10. A method as in claim 1, wherein selecting a candidate boundary comprises selecting a location within the segmentation window with an associated value that is one of the following: an extrema value compared to the plurality of values, a minimum value compared to the plurality of values, a maximum value compared to the plurality of values, a value with the longest run of 1 bits in its value compared to the plurality of values, or a value with the most 1 bits in its value compared to the plurality of values.

11. A method as in claim 1, wherein the segment boundary location is determined such that a segment is defined.

12. A method as in claim 11, wherein the segment represents a segment in a sequence of segments.

13. A method as in claim 11, wherein the segment enables reconstruction of data values of a segment in a sequence of segments.

14. A method as in claim 11, wherein the segment enables identification of a difference between a first segment and a second segment.

15. A method as in claim 11, wherein the segment enables identification of a similarity between a first segment and a second segment.

16. A method as in claim 11, wherein the segment enables elimination of duplicate segments.

17. A method as in claim 11, wherein the segment enables one of the following: a storage system, a backup storage system, or a transmission system.

18. A method as in claim 1, further comprising storing a computed value in an ordered stack of values, wherein the ordered stack of values includes ordered values computed since a last extrema value.

19. A method as in claim 18, wherein storing the value in the ordered stack of values includes comparing the computed value with values from the ordered stack of values.

20. A method as in claim 18, wherein storing the value in the ordered stack of values includes removing a value from the ordered stack of values.

21. A method as in claim 18, further comprising determining a boundary location based at least in part on the ordered stack of values.

22. A method as in claim 18, further comprising determining a boundary location based at least in part on the ordered stack of values, wherein the boundary location is offset an offset distance from a location associated with a value in the ordered stack of values.

23. A method as in claim 18, wherein the last extrema value comprises a last minimum value.

24. A method as in claim 18, wherein the last extrema value comprises a last minimum value and wherein placing the value in the ordered stack of values includes removing a value from the ordered stack of values in the event that the computed value is less than or equal to the value from the ordered stack of values.

25. A method as in claim 18, wherein the last extrema value comprises a last minimum value and wherein a boundary location is determined based on the lowest value in the ordered stack of values associated with a position within a segmentation window.

26. A method as in claim 18, wherein the last extrema value comprises a last maximum value.

27. A method as in claim 18, wherein the last extrema value comprises a last maximum value and wherein placing the value in the ordered stack of values includes removing a value from the ordered stack of values in the event that the computed value is greater than or equal to the value from the ordered stack of values.

28. A method as in claim 18, wherein the last extrema value comprises a last maximum value and wherein a boundary location is determined based on the highest value in the ordered stack of values associated with a position within a segmentation window.

29. A system for selecting a segment boundary comprising:
a processor; and
a memory coupled with the processor, wherein the memory is configured to provide the processor with instructions which when executed cause the processor to:
determine a segmentation window;
compute a plurality of values associated with candidate boundaries within the segmentation window;
select one of the candidate boundaries based at least in part on a comparison between two or more of the computed values; and
determine a boundary within the segmentation window.

30. A computer program product for selecting a segment boundary, the computer program product being embodied in a computer readable medium and comprising computer instructions for:
determining a segmentation window;
computing a plurality of values associated with candidate boundaries within the segmentation window;
selecting one of the candidate boundaries based at least in part on a comparison between two or more of the computed values; and
determining a boundary within the segmentation window.

* * * * *